United States Patent
Wang

Patent Number: 5,818,565
Date of Patent: *Oct. 6, 1998

[54] EYEGLASSES WITH SUNSHADE

[76] Inventor: Wen Te Wang, #246-1, Kang Kou, Kang Kou Tsun, An Ting Hsiang, Tainan Hsien, Taiwan

[*] Notice: The term of this patent shall not extend beyond the expiration date of Pat. No. 5,335,025.

[21] Appl. No.: 842,610

[22] Filed: Apr. 15, 1997

[51] Int. Cl.⁶ .................................................... G02C 7/10
[52] U.S. Cl. .................................. 351/44; 351/47; 2/453
[58] Field of Search ............................ 351/44, 47; 2/12, 2/13, 453

[56] References Cited

U.S. PATENT DOCUMENTS

| 5,335,025 | 8/1994 | Wang .................................. 351/47 |
| 5,347,655 | 9/1994 | Garrett ............................... 2/453 |

Primary Examiner—Huy Mai
Attorney, Agent, or Firm—Pro-Techtor International Services

[57] ABSTRACT

An eyeglass structure includes an eyeglass frame defining two rims each receiving and holding therein a lens. Each of the rims has a recessed notch defined by two opposite side walls spaced from each other with a pivot pin extending from one of the side walls to substantially midway of the spacing between the side walls. A sunshade has two projections, each having a through hole through which each of the pivot pins extends so as to allow the sunshade to be movable between an active position where the sunshade is substantially normal to the lenses to block sun light coming from above the eyeglass structure and a stowed position wherein the sunshade is adjacent to and substantially cover the lenses to protect and block light coming from the front side from incidence onto the lenses. The projections of the sunshade have a thickness smaller than the distance between the free ends of the pivot pins and the opposite side walls of the notches so as to allow the projections to be received within the distances and then moved toward the pivot pins to have the pins fit into the holes. One of the pivot pins is provided with an expanded end for preventing the sunshade from disengaging from the notch of the eyeglasses. The expanded end is preferably provided with an inclined outer surface for facilitating insertion of the pivot pin into the respective hole of the sunshade.

9 Claims, 5 Drawing Sheets

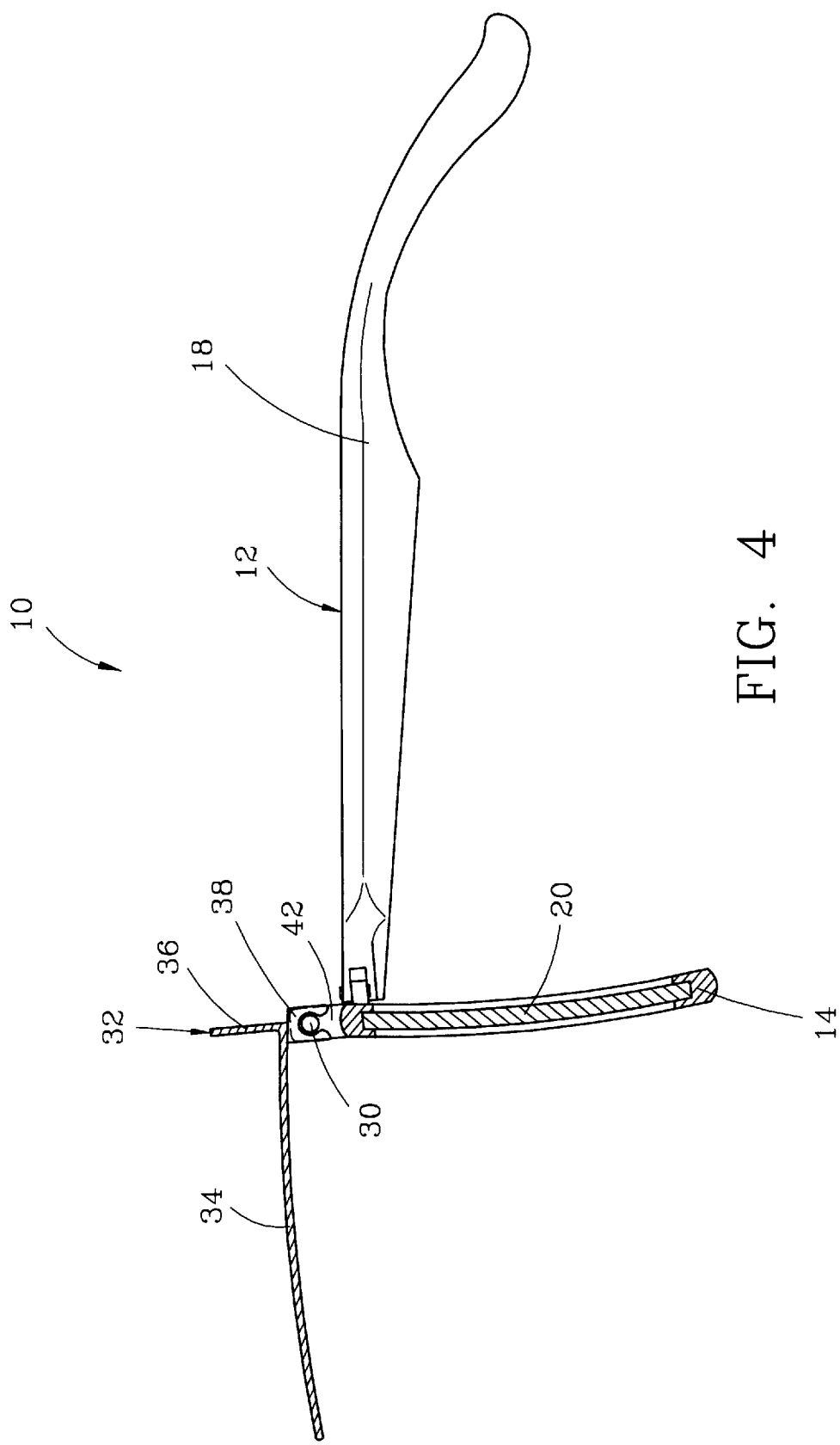

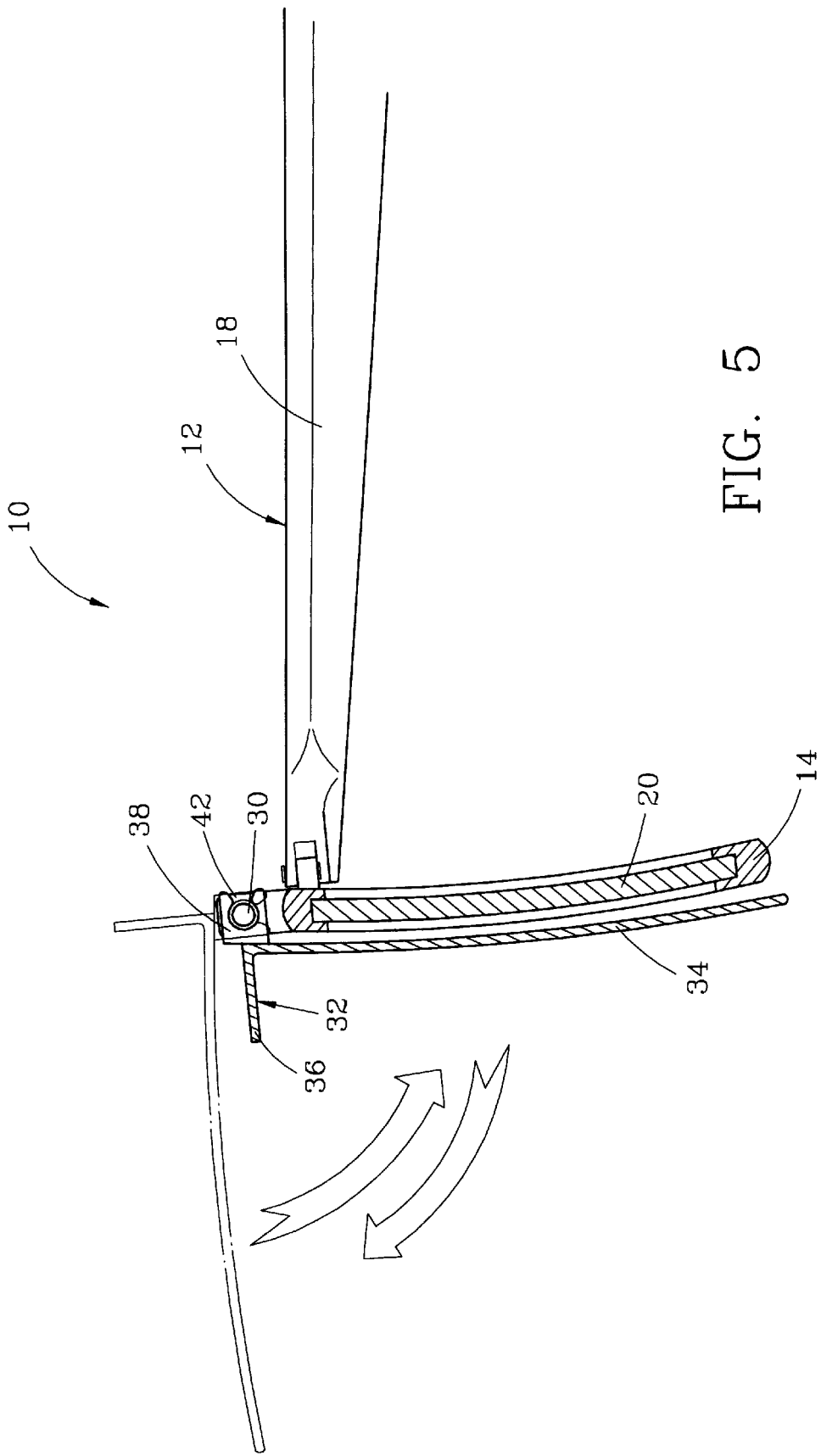

EYEGLASSES WITH SUNSHADE

FIELD OF THE INVENTION

The present invention relates to eyeglasses and in particular to eyeglasses with a sunshade mounted thereon.

BACKGROUND OF THE INVENTION

For those having vision problems, eyeglasses are the most common solution for correcting their vision. Wearing eyeglasses inevitably has disadvantages. For example, in engaging outdoor activities in sun shining days, people are used to wearing sun glasses to protect their eyes from being damaged by intense sun light, but for those wearing vision correcting eyeglasses, it is not possible to wear the vision correcting eyeglasses and the sun glasses at the same time. An alternative way to prevent sun light to be directly incident onto eyes is to use a sunshade. It is thus desirable to provide an eyeglass structure which has a sunshade incorporated thereon so as to protect the eyeglass wearer's eyes from being damaged by direct incidence of the sun light.

OBJECTS OF THE INVENTION

Therefore, an object of the present invention is to provide an eyeglass structure which comprises a sunshade releasably mounted thereon to block direct incidence of sun light onto the wearer's eyes.

Another object of the present invention is to provide an eyeglass structure having a sunshade mounted thereon in such a manner to be movable between an active position where the sunshade blocks sun light from direct incidence onto the wearer's eyes and a stowed position where the sunshade is located closely next to and substantially fully covers the lenses of the eyeglasses so as to protect the lenses from being damaged by being impacted or struck.

A further object of the present invention is to provide an eyeglass structure having a sunshade made of a light transmitting material having a low light transmissivity with an edge mounted on the top side of eyeglass frame to be movable between a first shading position where the sunshade is substantially normal to the eyeglass lenses to block sun light from above the wearer of the eyeglasses and a second shading position where the sunshade is located closely next to the lenses and substantially parallel with the lenses to fully shield the lenses so as to block sun light from the front side of the wearer.

To achieve the above and other objects, there is provided an eyeglass structure which comprises a pair of eyeglasses having a frame defining two rims to receive and hold therein lenses, each of the rims having a recessed notch having two opposite sides spaced from each other with one pivot pin extending from one of the sides to substantially midway of the spacing between the sides. A sunshade has two projections, each having a through hole through which each of the pivot pins of the eyeglasses extends so as to allow the sunshade to be movable between an active position where the sunshade is located above and substantially normal to the lenses to block sun light from the above side of the eyeglass wearer from direct incidence onto the eyes of the eyeglass wearer and a stowed position wherein the sunshade is located closely next to and substantially parallel with the lenses so as to substantially fully shield the lenses. The projections of the sunshade have a thickness smaller than the distance between the free ends of the pivot pins and the opposite sides of the recessed notches so as to allow the projections to be received within the distances and then moved toward the pivot pins to have the pins fit into the holes. One of the pivot pins is provided with an expanded end for preventing the sunshade from disengaging from the recessed notches of the eyeglasses. The expanded end is preferably provided with an inclined outer surface for facilitating insertion of the pivot pin into the respective hole of the sunshade.

BRIEF DESCRIPTION OF THE DRAWINGS

The present invention will be better understood from the following description of a preferred embodiment thereof, which is illustrative and not limitative, with reference to the attached drawings, wherein:

FIG. 4 is a side elevational view, partially sectional, showing the eyeglass structure of the present invention with the sunshade in the active position; and FIG. 5 is a side elevational view, partially sectional, showing the eyeglass structure of the present invention with the sunshade in the stowed position.

DETAILED DESCRIPTION OF THE PREFERRED EMBODIMENT

Figure 1:
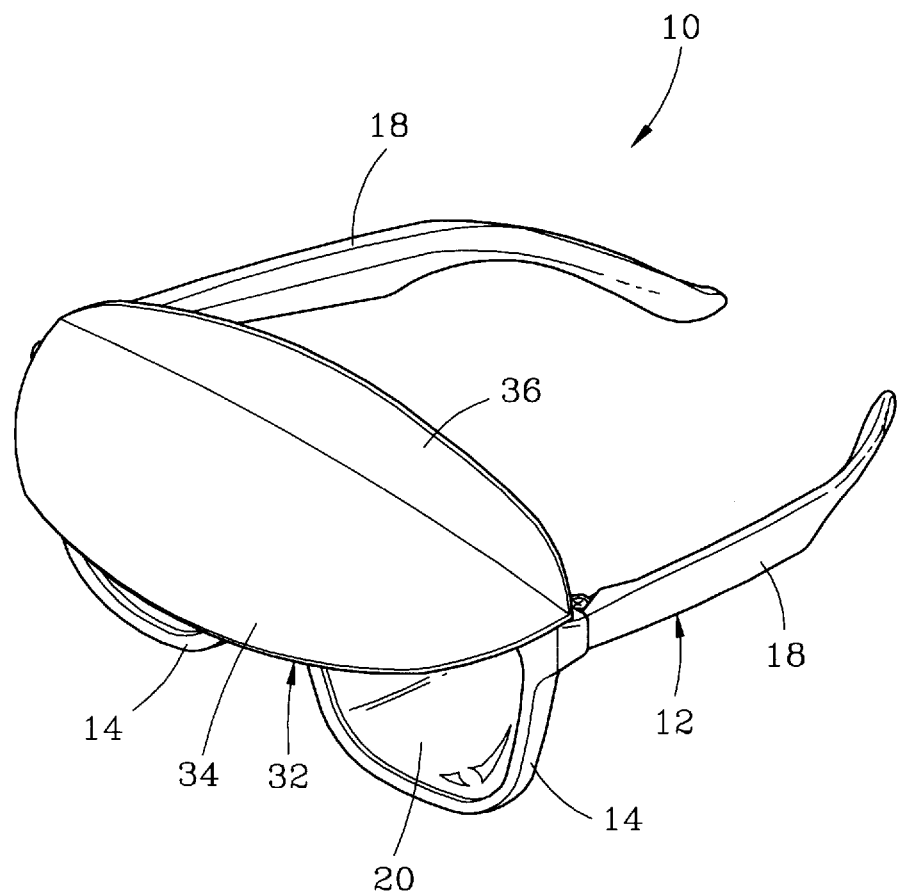
FIG. 1 is a perspective view showing an eyeglass structure in accordance with the present invention wherein a sunshade is mounted to a pair of eyeglass with the sunshade in an active position to block sun light.
Figures 2, 2A, 2B, 2C:
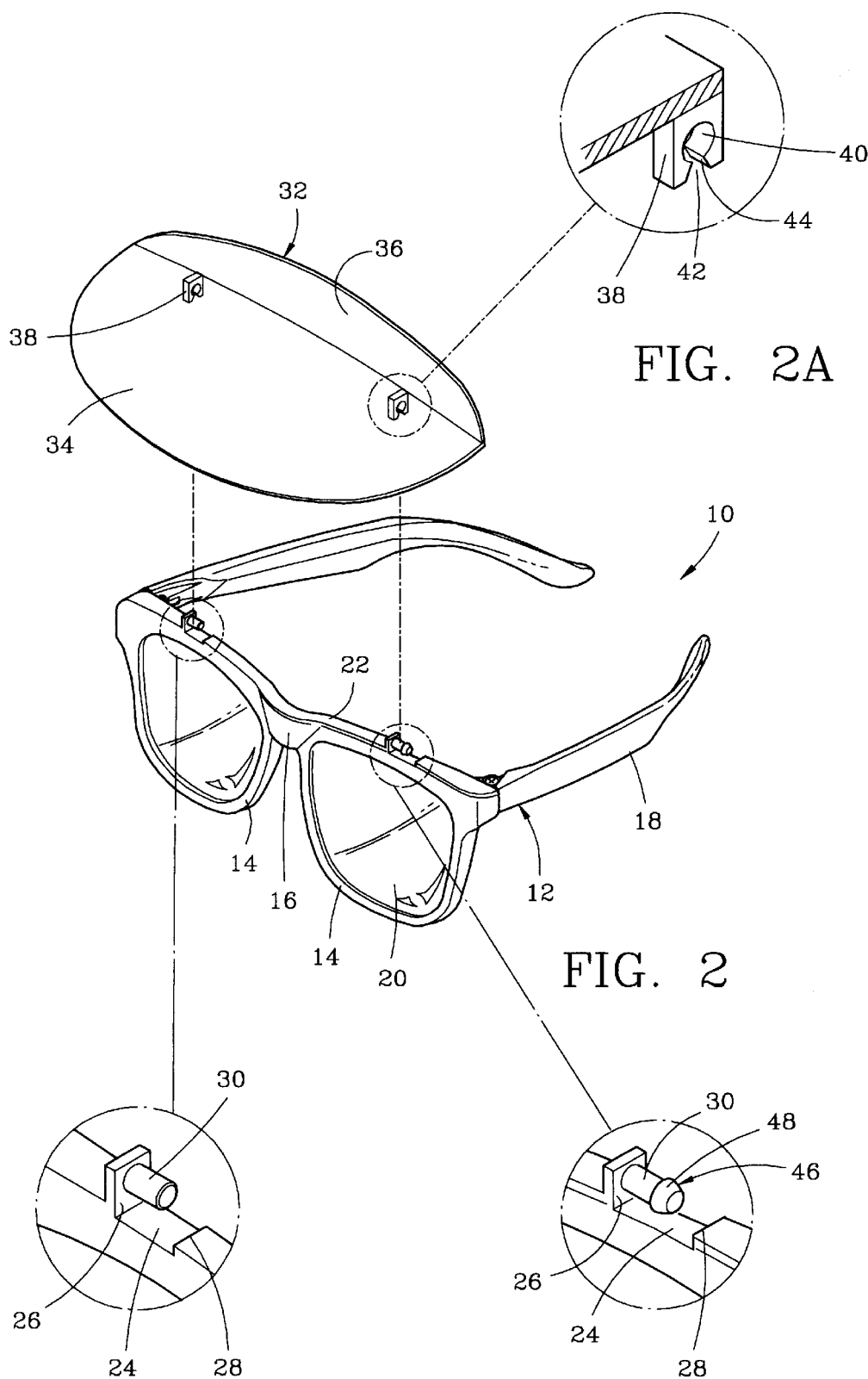
FIG. 2 is an exploded perspective view of the eyeglass structure of the present invention.

With reference to the drawings and in particular to FIGS. 1 and 2, wherein an eyeglass structure in accordance with the present invention, generally designated at the reference numeral 10, is shown, the eyeglass structure 10 comprises a regular eyeglass frame 12 having two rims 14 each having an inner side connected to each other by means of a bridge 16 and an outer side with a temple 18 pivotally mounted thereto. Each of the rims 14 has a lens 20 received and held therein. Each of the rims 14 has a top edge 22 on which a notch 24 is formed, defined by two spaced side walls 26 and 28 with a pivot pin 30 extends from one of the side walls, for example side wall 26 as illustrated in the drawings, toward the opposite side wall 28 and preferably terminated at midway between the two side walls 26 and 28 so as to define a gap between the free end of the pivot pin 30 and the opposite side wall 28.

Figures 3, 3A:
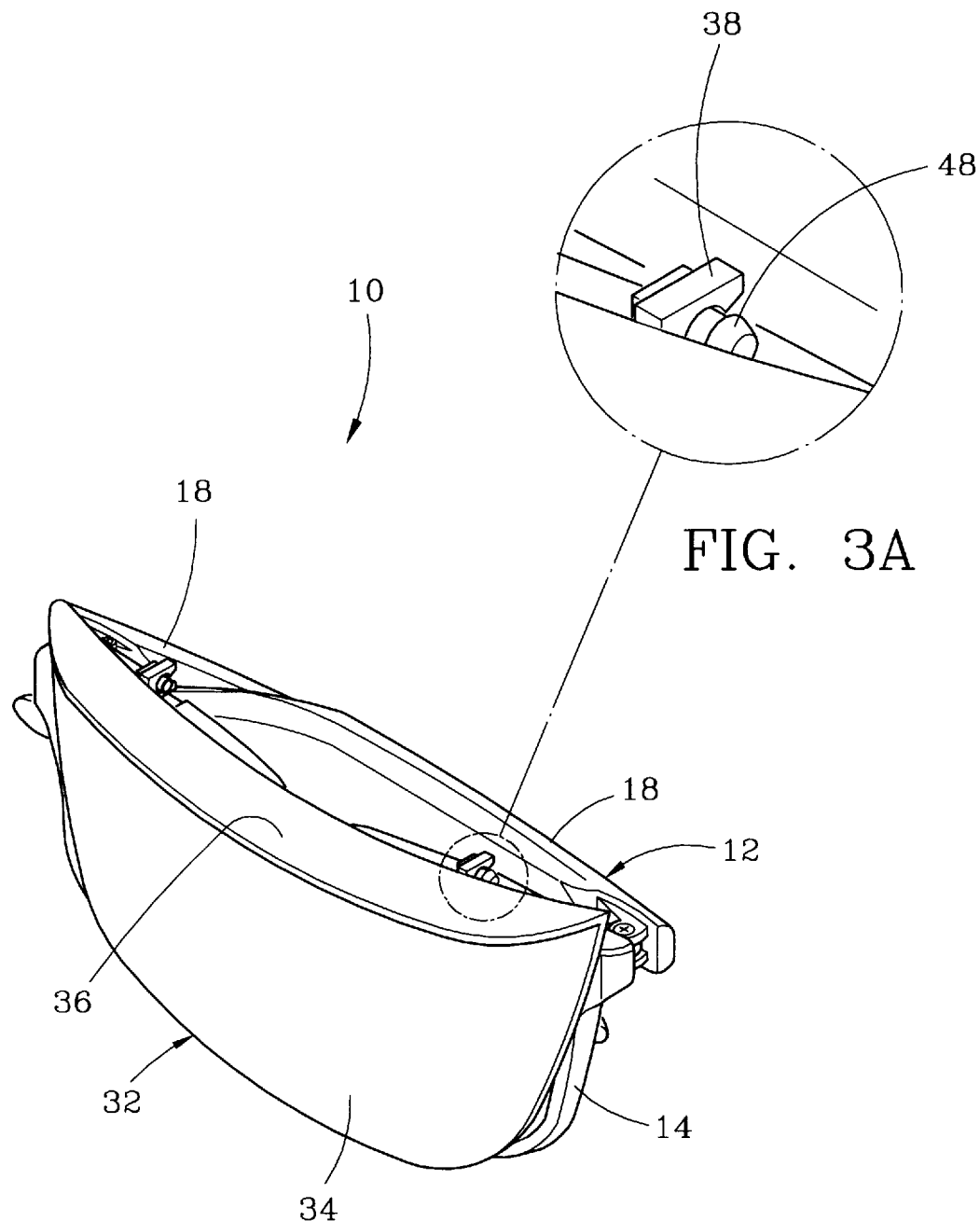
FIG. 3 is a perspective view showing the eyeglass structure in accordance with the present invention with the sunshade in a stowed position.

The eyeglass structure 10 further comprises a sunshade 32 having a visor portion 34 and a flange portion 36 with the flange 36 substantially normal to the visor 34 to define an L-shaped cross section, as shown in FIGS. 4 and 5. The visor 34 comprises two spaced projections or lugs 38 each having a through hole 40 formed thereon. Preferably, each of the holes 40 has a side opening 42 defined by two opposite, outward-diverging side faces 44. The projections 38 are located corresponding to the notches 24 of the eyeglass frame 12 and has such a thickness as to allow the projections 38 to be received within the gaps between free ends of the pivot pins 30 and the opposite side walls 28 with the pivot pins 30 in alignment with the holes 40. Thus by moving the visor 34 in such a direction to have the projections 38 move toward the pivot pins 30, the pins 30 are then received into the holes 40 so as to define a pivotal connection between the sunshade 32 and the eyeglass frame 12 which allows the visor 34 to be rotatable with respect to the eyeglass frame 12 between a first (active) position, as shown in FIGS. 1 and 4, where the visor 34 is located above and substantially normal to the lenses 20 for blocking sun light from above the lenses from direct incidence onto the lenses 20 and a second (stowed) position, as shown in FIGS. 3 and 5, where the visor 34 is moved to be located closely next to and substantially parallel with the lenses 20 so as to shield and thus protect the lenses 20 from being impacted or struck. In FIG. 5, the active position of the visor 34 is also shown, but by phantom lines with two arrows indicating the movement of the visor 34 between the active position and the stowed position.

Preferably at least one of the pivot pins 30 is provided with an expanded end 46 for the purpose of preventing the pivot pins 30 from readily disengaging from the holes 40 of the projections 38 so as to securely hold the sunshade 32 on the eyeglass frame 12, as shown in FIG. 3. Preferably, the expanded end 46 of the pivot pin 30 is provided with an inclined camming surface 48 for facilitating the insertion of the pivot pin 30 that has the expanded end 46 into the hole 40 of the respective projection 38 of the sunshade 32.

The side openings 42 with diverging side faces 44 provided on the projections 38 allows the projections 38 to be directly fit onto the pivot pins 30 which is facilitated by means of camming action provided by the diverging side faces 44. The side openings 42 also allow the projections 38 to be directly separated from the pivot pins 30 so as to separate the sunshade 32 from the eyeglass frame 12.

To provide a better blockage of sun light coming from above the lenses from directly projecting through the lenses, the sunshade is preferably made of a light in-transmitting material or is made opaque. However, in accordance with another aspect of the present invention, the sunshade 32 may be made of a light transmitting material but having a lower light transmissivity so that when the sunshade 32 is located at the stowed position where it is located in front the lenses 20 and substantially shielding the lenses 20, the sunshade 32 may serve as means for preventing sun light coming from the front side from direct incidence onto the lenses 20 and thus functioning as a sunglasses lens. Thus, the sunshade 32 may be considered movable (as indicated by the arrows of FIG. 5) between the first position (phantom lines of FIG. 5) where it offers a shading function for light coming from the above the lenses 20 and the second position (solid lines of FIG. 5) where it offers a shading function for light coming from the front side of the lenses 20. Further, when the visor 34 is located at the second shading position, as shown in FIG. 5, the flange 36 is located above and substantially normal to the lenses 20 so as to serve as means for blocking light coming from above the lenses 20.

It is apparent that although the present invention is illustrated with the description of the preferred embodiment, it is contemplated that there may be changes and modifications in the described embodiment that can be carried out without departing from the scope of the invention which is intended to be limited only by the appended claims.

What is claimed is:

1. An eyeglass structure comprising an eyeglass frame having two rims fixed together and each having a lens received and fixed therein, each of the rims having a top edge on which a notch is formed, defined by two spaced side walls with a pivot pin extending from a first one of the side walls of the notch toward a second opposite one of the side walls of the notch, the pivot pin having a free end terminating at a position spaced from the second side wall and defining therebetween a gap, a sunshade having a visor having two projections formed thereon to be corresponding to the notches of the eyeglass frame, each of the projections having a through hole formed thereon, the projection having a thickness receivable within the gap of the respective notch to have the through hole thereof substantially in alignment with the respective pivot pin for receiving the pin therethrough to define a pivotal connection between the sunshade and the eyeglass frame to allows the sunshade to be rotatable with respect to the eyeglass frame between a first position where the visor is located above and substantially normal to the lenses to block light coming from above the lenses from being directly incident onto the lenses and a second position where the visor is located closely next to and substantially parallel with the lenses to substantially completely shield the lenses.

2. The eyeglass structure as claimed in claim 1, wherein at least one of the pivot pin comprises an expanded end at the free end thereof which is larger than the hole of a respective projection so as to securely hold the pivot pin within the hole.

3. The eyeglass structure as claimed in claim 2, wherein the expanded end of the pivot pin comprises an inclined outer surface for facilitating insertion of the expanded end into the hole of the respective projection.

4. The eyeglass structure as claimed in claim 1, wherein the visor of the sunshade is made light in-transmittable.

5. The eyeglass structure as claimed in claim 1, wherein the visor of the sunshade serves to protect the lenses when the visor is located at the second position.

6. The eyeglass structure as claimed in claim 1, wherein the visor is made of a light transmitting material having a low light transmissivity so that when the visor is located at the second position, the visor serves as means to block lighting coming from the front side of the lenses.

7. The eyeglass structure as claimed in claim 6, wherein the sunshade further comprises a flange mounted to the visor to be substantially normal thereto so that when the visor is located at the second position, the flange is located above and substantially normal to the lenses so as to provide blockage of light coming from above the lenses.

8. The eyeglass structure as claimed in claim 1, wherein the hole of each of the projections of the sunshade comprises a side opening.

9. The eyeglass structure as claimed in claim 8 wherein the side opening comprises two diverging side faces.

* * * * *